US008384724B2

(12) United States Patent
Lu

(10) Patent No.: US 8,384,724 B2
(45) Date of Patent: Feb. 26, 2013

(54) COORDINATING APPARATUS AND IMAGE PROCESSING SYSTEM UTILIZING THE SAME

(75) Inventor: Yan-Hong Lu, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 1258 days.

(21) Appl. No.: 12/007,530

(22) Filed: Jan. 11, 2008

(65) Prior Publication Data

US 2009/0058865 A1 Mar. 5, 2009

(30) Foreign Application Priority Data

Sep. 5, 2007 (TW) ............................ 096133073 A

(51) Int. Cl.
*G06T 1/20* (2006.01)

(52) U.S. Cl. ........................................ 345/506; 345/605

(58) Field of Classification Search .................. 345/506, 345/605

See application file for complete search history.

(56) References Cited

U.S. PATENT DOCUMENTS 5,953,021 A * 9/1999 Cheng ........................... 345/544
6,625,207 B1 * 9/2003 Nitta et al. .................... 375/219
2002/0048323 A1 * 4/2002 Kang et al. ............... 375/240.27

* cited by examiner

*Primary Examiner* — Maurice L McDowell, Jr.
(74) *Attorney, Agent, or Firm* — McClure, Qualey & Rodack, LLP

(57) ABSTRACT

A coordinating apparatus for coordinating data transmission between a data providing device and a display device is provided. The display device conforms to a transmission standard. The coordinating apparatus includes a programmable coordinating module and an outputting module. The programmable coordinating module is programmed according to the transmission standard. The programmable coordinating module is used for receiving M bits of image data from the data providing device, extracting N bits of image data among the M bits of image data, and arranging the N bits of image data into N bits of arranged data. The outputting module is used for outputting the N bits of arranged data to the display device.

14 Claims, 7 Drawing Sheets

Control signals relative to the first transmission duration

| | |
|---|---|
| T1EnR | Should image data corresponding to red be outputted in the first transmission duration |
| T1EnG | Should image data corresponding to green be outputted in the first transmission duration |
| T1EnB | Should image data corresponding to blue be outputted in the first transmission duration |
| T1RLen | Length of image data corresponding to red in the first transmission duration |
| T1GLen | Length of image data corresponding to green in the first transmission duration |
| T1BLen | Length of image data corresponding to blue in the first transmission duration |
| T1ROffset | Start bit of image data corresponding to red in the first transmission duration |
| T1GOffset | Start bit of image data corresponding to green in the first transmission duration |
| T1BOffset | Start bit of image data corresponding to blue in the first transmission duration |

FIG. 3(A)

Control signals relative to the second transmission duration

| | |
|---|---|
| T2EnR | Should image data corresponding to red be outputted in the second transmission duration |
| T2EnG | Should image data corresponding to green be outputted in the second transmission duration |
| T2EnB | Should image data corresponding to blue be outputted in the second transmission duration |
| T2RLen | Length of image data corresponding to red in the second transmission duration |
| T2GLen | Length of image data corresponding to green in the second transmission duration |
| T2BLen | Length of image data corresponding to blue in the second transmission duration |
| T2ROffset | Start bit of image data corresponding to red in the second transmission duration |
| T2GOffset | Start bit of image data corresponding to green in the second transmission duration |
| T2BOffset | Start bit of image data corresponding to blue in the second transmission duration |

FIG. 3(B)

Control signals relative to the third transmission duration

| | |
|---|---|
| T3EnR | Should image data corresponding to red be outputted in the third transmission duration |
| T3EnG | Should image data corresponding to green be outputted in the third transmission duration |
| T3EnB | Should image data corresponding to blue be outputted in the third transmission duration |
| T3RLen | Length of image data corresponding to red in the third transmission duration |
| T3GLen | Length of image data corresponding to green in the third transmission duration |
| T3BLen | Length of image data corresponding to blue in the third transmission duration |
| T3ROffset | Start bit of image data corresponding to red in the third transmission duration |
| T3GOffset | Start bit of image data corresponding to green in the third transmission duration |
| T3BOffset | Start bit of image data corresponding to blue in the third transmission duration |

FIG. 3(C)

COORDINATING APPARATUS AND IMAGE PROCESSING SYSTEM UTILIZING THE SAME

BACKGROUND OF THE INVENTION

1. Field of the Invention

The present invention relates to image processing techniques, and in particular to an apparatus for coordinating data transmission between a data providing device and a display device.

2. Description of the Prior Art

The thin film transistor LCD (TFT LCD) is one of the most popular displays at the present day. As known by those skilled in the art, for TFT LCDs, the interfaces of receiving external image data can be roughly divided into two classes: RGB interface and CPU interface. In addition, the transmission modes of the external image data can be classified into single transmission modes, two-time transmission modes, and three-time transmission modes.

Please refer to FIG. 1(A), which illustrates an example of the image data of a pixel. In this example, the pixel is represented by 24 bits of data including eight bits of red data (R0~R7), eight bits of green data (G0~G7), and eight bits of blue data (B0~B7). As shown in FIG. 1(B), under the single transmission mode, the 24 bits of data are transmitted to a TFT LCD in one transmission duration. Under the two-time transmission mode, the 24 bits of data are divided into two groups; the two groups are transmitted to a TFT LCD in two different transmission durations. Under the three-time transmission mode, the 24 bits of data are divided into three groups respectively transmitted to a TFT LCD in three different transmission durations.

Under some conditions, the resolution of the display is lower than the number of bits provided by a data providing device (e.g. CPU). For instance, although the data providing device provides 24 bits of data to represent each pixel, the resolution of the display may only be 18 bits (respectively 6 bits of red, green, and blue). Therefore, the two least significant bits of each color (e.g. R0 and R1 for red) must be abandoned. Taking the two-time transmission mode for example, the 18 bits of data which is finally transmitted to the display is shown in FIG. 1(C).

To adjust data provided by a data providing device into the formats required by a display, there is usually a coordinating circuit between the data providing device and the display. The coordinating circuit is responsible for selecting and arranging image data needed by the display.

In prior arts, to satisfy different requirements of different displays, designers of the coordinating circuit must provide various kinds of coordinating circuits at the output end of a data providing device. Once the data providing device is going to cooperate with a new display/transmission specification, the designers must re-design or re-organize the circuits, so as to provide the corresponding coordinating function. Much cost and time are accordingly wasted.

SUMMARY OF THE INVENTION

To solve the aforementioned problems, the invention provides a coordinating apparatus for coordinating transmission of image data. A programmable coordinating module is utilized so as to provide high flexibility for various display specifications.

One embodiment according to the invention is a coordinating apparatus for coordinating data transmission between a data providing device and a display device. The display device conforms to a transmission standard. The coordinating apparatus includes a programmable coordinating module and an outputting module. The programmable coordinating module is programmed according to the transmission standard and used for receiving M bits of image data from the data providing device, extracting N bits of image data among the M bits of image data, and arranging the N bits of image data into N bits of arranged data. The outputting module is used for outputting the N bits of arranged data to the display device.

The advantage and spirit of the invention may be understood by the following recitations together with the appended drawings.

BRIEF DESCRIPTION OF THE APPENDED DRAWINGS

FIGS. 3(A)~3(C) are the tables of control signals according to the invention.

Figure 4:
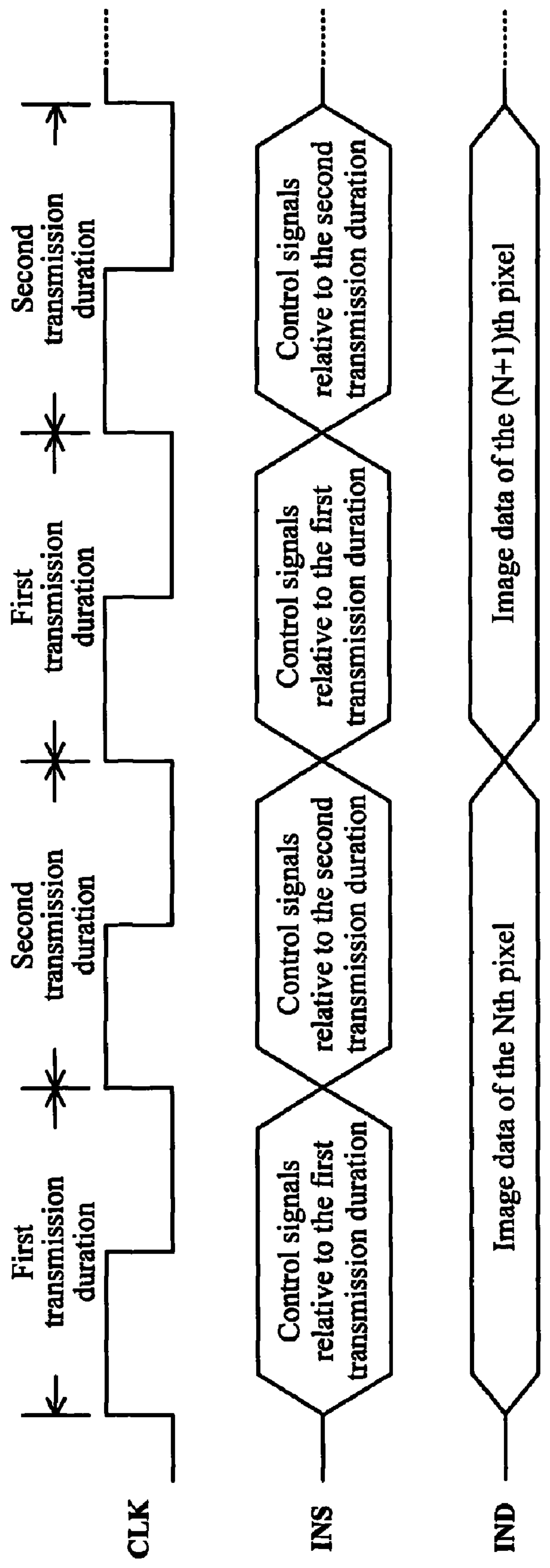

FIG. 4 shows the timing relationship of the output signal of the multiplexer and the clock signal.

Figure 5A:
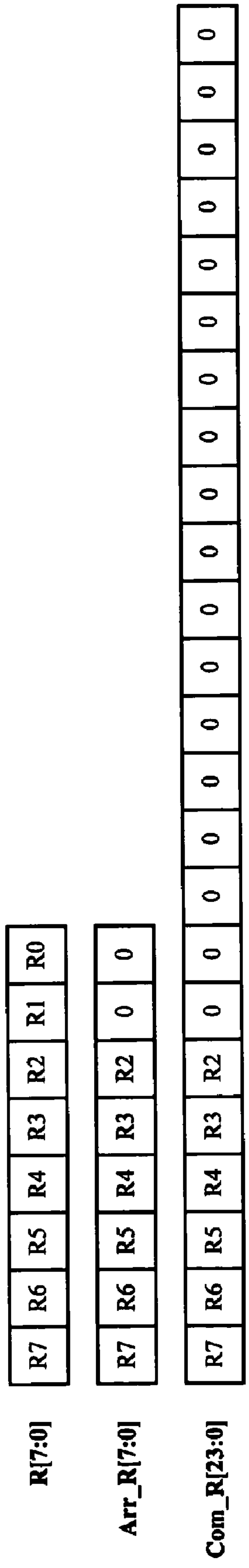
Figure 5B:
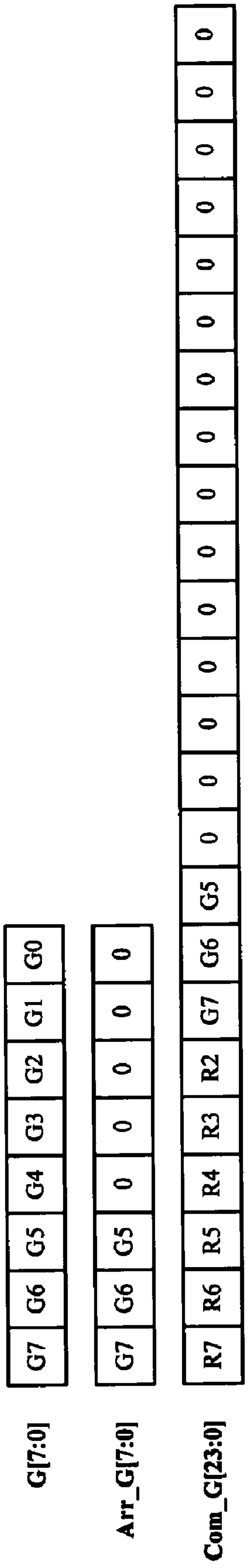

FIG. 5(A) shows examples of the data R[7:0], Arr_R[7:0], and Com_R[23:0]; FIG. 5(B) shows examples of the data G[7:0], Arr_G[7:0], and Com_G[23:0].

DETAILED DESCRIPTION OF THE INVENTION

One embodiment according to the invention is a coordinating apparatus for coordinating data transmission between a data providing device and a display device. The display device conforms to a transmission standard. The coordinating apparatus includes a programmable coordinating module and an outputting module. The programmable coordinating module is programmed according to the transmission standard and used for receiving M bits of image data from the data providing device, extracting N bits of image data among the M bits of image data, and arranging the N bits of image data into N bits of arranged data. The outputting module is used for outputting the N bits of arranged data to the display device. M is a positive integer and N is a positive integer smaller than or equal to M.

Figures 1A, 1B, 1C:
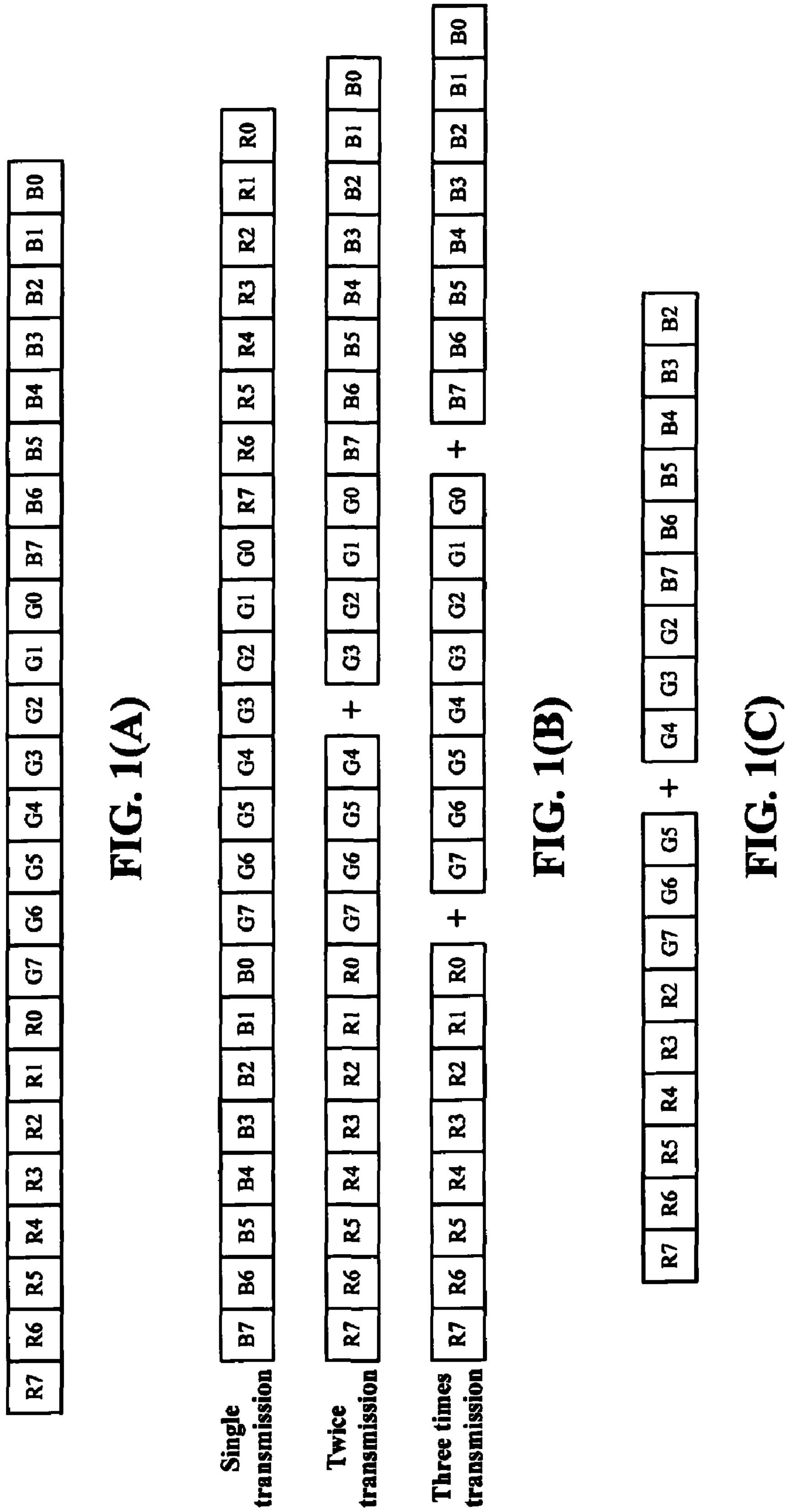
FIG. 1(A) is an example of the image data of a pixel.
FIG. 1(B) illustrates data combinations under different transmission modes.
FIG. 1(C) shows an example of the data combination under the three-time transmission mode.

Assume the data provided by the data providing device is represented as shown in FIG. 1(A) and the data requested by the transmission standard is represented as shown in FIG. 1(C). In this example, M is equal to 24 and N is equal to 9. More specifically, the 24 bits of image data will be reduced to 18 bits of data and transmitted to the display in two transmission durations, 9 bits each time. The first transmission duration is corresponding to data of R2~R7 and G5~G7; the second transmission duration is corresponding to data of G2~G4 and B2~B7.

Figure 2:
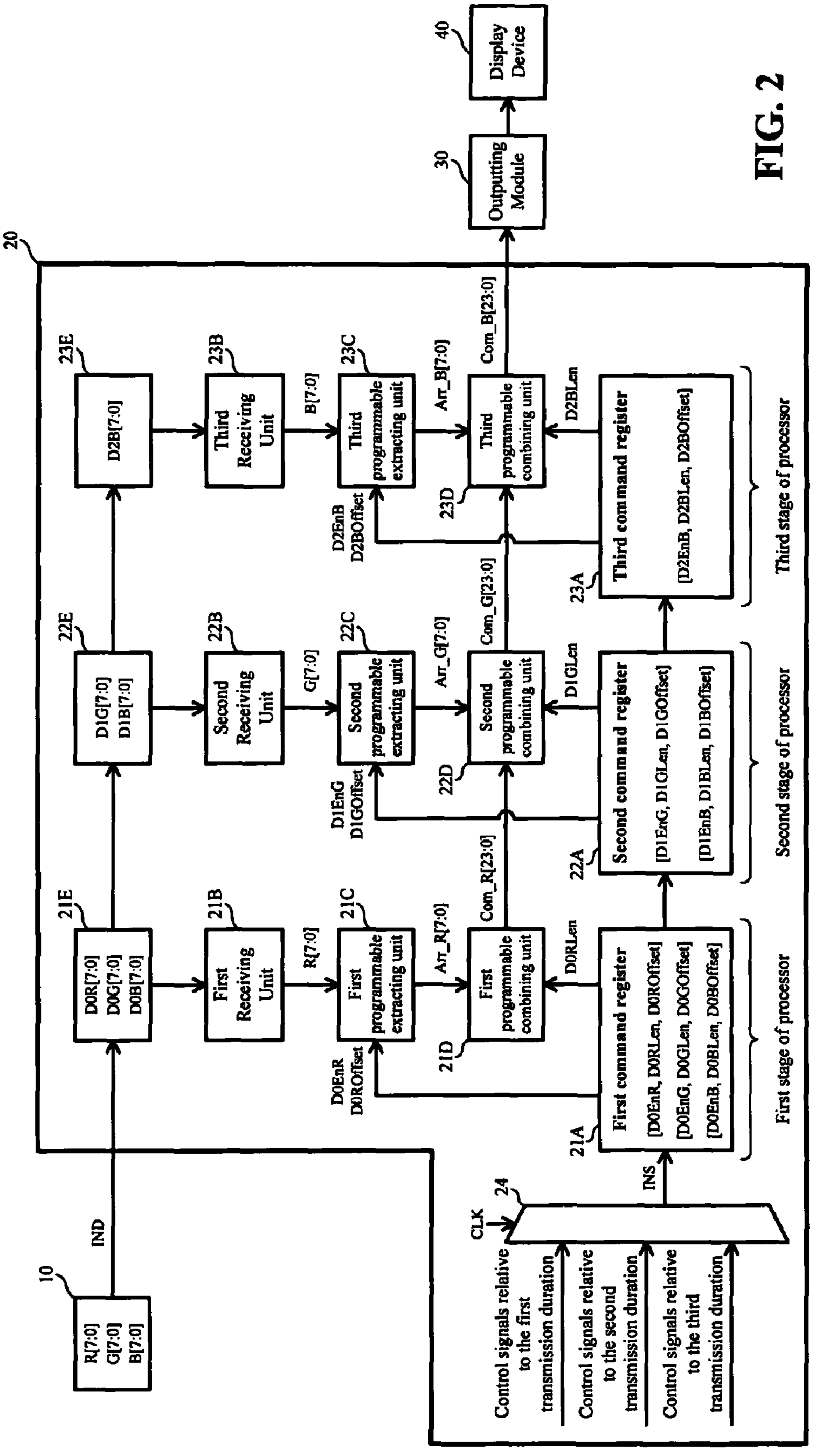
FIG. 2 illustrates a detailed embodiment of the coordinating apparatus according to the invention.

Please refer to FIG. 2, which illustrates a detailed embodiment of the coordinating apparatus according to the invention. Based on the above assumptions, the 24 bits of image data comprises data of three colors. In this example, the programmable coordinating module 20 correspondingly includes pipelined three stages of processors. Each of the stages is responsible for selecting and arranging the image data of one color. Because most transmission modes currently used are at most the three-time transmission mode, this illustration takes the condition that the programmable coordinating module 20 can support the single, two-time, and three-time transmission modes as an example.

As shown in FIG. 2, each of the stages respectively includes a data register, a command register, a receiving unit, a programmable extracting unit, and a programmable combining unit.

According to the invention, designers can adjust the operation of the programmable coordinating module 20 with a set of control signals. Tables in FIG. 3(A)~FIG. 3(C) show three sets of exemplary control signals according to the invention. Each set of the control signals is corresponding to one specific transmission duration. The three sets of control signals are inputted into the multiplexer 24 in FIG. 2 and selectively forwarded through the multiplexer 24. Taking the aforementioned condition as an example, because the display 40 requests the two-time transmission mode, only the control signals relative to the first and second transmission durations will be forwarded through the multiplexer 24, and the control signals relative to the third transmission duration will not be utilized.

Please refer to FIG. 4, which illustrates the timing relationship of the clock signal (CLK), the output of the multiplexer 24 (INS), and the output of the data providing device 10 (IND). As shown in FIG. 4, an Nth pixel is processed in two transmission durations, and an (N+1)th pixel is processed in the next two transmission durations.

In the first transmission duration, the control signals relative to the first transmission duration are registered into the first command register 21A. More specifically, for the first command register 21A in the first transmission duration, D0EnR is T1EnR, D0EnG is T1EnG, D0EnB is T1EnB, D0RLen is T1RLen, D0GLen is T1Glen, D0BLen is T1BLen, D0ROffset is T1ROffset, D0GOffset is T1GOffset, and D0BOffset is T1BOffset.

Subsequently, in the second transmission duration, the control signals relative to the second transmission duration are forwarded through the multiplexer 24 and registered into the first command register 21A. The control signals relative to the first transmission duration originally registered in the first command register 21A are forwarded to the second command register 22A. In this example, only the control signals relative to the first transmission duration and corresponding to green (G) and blue (B) will be forwarded to the second command register 22A. Similarly, in the next transmission duration, only the control signals relative to the first transmission duration and corresponding to blue (B) will be forwarded to the third command register 23A.

As shown in FIG. 1(C), the data first transmitted to the display 40 should be R2~R7 and G5~G7. Therefore, T1EnR and T1EnG are both "YES", T1EnB is "NO", T1RLen is six, T1Glen is three, and T1BLen can be neglected. In addition, T1ROffset is two, T1GOffset is five, and T1BOffset can be neglected, too.

Similarly, the data subsequently transmitted to the display 40 should be G2~G4 and B2~B7. Hence, T2EnG and T2EnB are both "YES", T2EnR is "NO", T2Glen is three, T2BLen is six, and T2RLen can be neglected. Besides, T2GOffset and T2BOffset are both two, and T2ROffset can be neglected.

The data providing device 10 is used for providing image data corresponding to each pixel to the data registers (21E, 22E, and 23E). The first receiving unit 21B is used for receiving image data corresponding to red (D0R[7:0]) from the first data register 21E. The second receiving unit 22B is used for receiving image data corresponding to green (D1G[7:0]) from the second data register 22E. The third receiving unit 23B is used for receiving image data corresponding to blue (D2B[7:0]) from the third data register 23E. The time of processing the received data in each stage of processor equals the length of one transmission duration. After completing the processing procedure, each stage of processor will forward the processed data to the next stage of processor.

Taking the first stage of processor as an example, the first programmable extracting unit 21C selects and arranges R[7:0] to generate a first set of arranged data (Arr_R[7:0]) based on the control signals, D0EnR and D0ROffset, provided by the first command register 21A. Afterward, the first programmable combining unit 21D transforms Arr_R[7:0] in to a first set of combined data (Com_R[23:0]) based on the control signal, D0RLen, provided by the first command register 21A. Please refer to FIG. 5(A), which shows R[7:0], Arr_R[7:0], and Com_R[23:0].

Similarly, the second programmable extracting unit 22C selects and arranges G[7:0] to generate a second set of arranged data (Arr_G[7:0]) based on the control signals, D0EnG and D0GOffset, provided by the second command register 22A. Then, the second programmable combining unit 22D combines Arr_G[7:0] and Com_R[23:0] generated by the first stage of processor to generate Com_G[23:0] based on the control signal, D0Glen, provided by the second command register 22A. Please refer to FIG. 5(B), which shows G[7:0], Arr_G[7:0], and Com_G[23:0].

In this example, because T1EnB is "NO", the third stage of processor will not add blue image data into Com_G[23:0]. Instead, the third stage of processor will directly forward Com_G[23:0], transmitted from the second programmable combining unit 22D, through the third programmable combining unit 23D. In other words, Com_B[23:0] and Com_G[23:0] corresponding to the first transmission duration are the same. As shown in FIG. 5(B), according to the control signals corresponding to the first transmission duration, the data to be transmitted through the outputting module 30 to the display 40 is R2~R7 and G5~G7. Similarly, by properly setting the control signals, corresponding to the second transmission duration, the data to be transmitted to the display 40 is G2~G4 and B2~B7. It can be seen that the data outputted from the outputting module 30 is correctly combined/arranged image data requested by the display 40.

Another embodiment according to the invention is an image processing system for providing image data to a display device conforming to a transmission standard. The image processing system includes a data providing device, a programmable coordinating module, and an outputting module. The data providing device provides M bits of image data. The programmable coordinating module is programmed according to the transmission standard and used for extracting N bits of image data among the M bits of image data and arranging the N bits of image data into N bits of arranged data. M is a positive integer and N is a positive integer smaller than or equal to M. The outputting module then outputs the N bits of arranged data to the display device. The operation of this embodiment is similar to that in FIG. 2 and is not explained again.

As described above, because the coordinating module according to the invention is programmable, high flexibility of cooperating with various display specifications can be provided to a data providing device. Compared with prior arts, the coordinating apparatus and the image processing system utilizing the coordinating apparatus can substantially save the cost and time of re-designing hardware.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A coordinating apparatus for coordinating data transmission between a data providing device and a display device, the display device conforming to a transmission standard, the transmission standard comprising at least a first transmission mode and a second transmission mode different from the first transmission mode, the coordinating apparatus comprising:

a programmable coordinating module, programmed according to the transmission standard, for receiving M bits of image data from the data providing device, extracting N bits of image data among the M bits of image data, and arranging the N bits of image data into N bits of arranged data, wherein M is a positive integer and N is a positive integer smaller than or equal to M, in the first transmission mode, the coordinating module is programmed to output N/L1 bits of arranged data within each of L1 transmission durations; in the second transmission mode, the coordinating module is programmed to output N/L2 bits of arranged data within each of L2 transmission durations, L1, L2, N/L1 and N/L2 are positive integers and L1≠L2; and an outputting module, electrically coupled to the programmable coordinating module, for outputting the N bits of arranged data to the display device.

2. The coordinating apparatus of claim 1, wherein the M bits of image data comprises data of P colors, the programmable coordinating module comprises pipelined P stages of processors, the image data of an ith color among the P colors is processed by an ith stage of processor among the P stages of processors, P is an positive integer, and i is an integer index ranging from 1 to P, the ith stage of processor comprises:

a receiving unit for receiving the image data of the ith color;

a programmable extracting unit, electrically coupled to the receiving unit and programmed according to the transmission standard, for extracting an ith set of selected data from the image data of the ith color and arranging the ith set of selected data into an ith set of arranged data; and a programmable combining unit, electrically coupled to the programmable extracting unit, for receiving the ith set of arranged data and selectively combining the ith set of arranged data with an (i-1)th set of combined data provided by the (i-1)th stage of processor to generate an ith set of combined data.

3. The coordinating apparatus of claim 2, wherein P is three, and the P colors are red, green, and blue.

4. The coordinating apparatus of claim 2, wherein the ith stage of processor further comprises a command register therein storing an ith set of control signals corresponding to the image data of the ith color; the programmable extracting unit and the programmable combining unit in the ith stage of processor are programmed according to the ith set of control signals.

5. The coordinating apparatus of claim 4, wherein the ith set of control signals comprises an enabling signal, a length signal, and a start signal; the enabling signal is relative to whether the ith stage of processor should output the image data of the ith color; the length signal is relative to a length of the image data of the ith color should be outputted by the ith stage of processor; the start signal is relative to a start bit of the image data of the ith color should be outputted by the ith stage of processor.

6. The coordinating apparatus of claim 2, wherein in the first transmission mode, the i-th extracting unit extracts and arranges Xij bits of image data into Xij bits of arranged data corresponding to a j-th transmission duration, i=1~P, j=1~L1, X1j+X2j+ . . . XPj=N/L1, Xij is a positive integer, and the P-th combining unit outputs N/L1 bits of combined data corresponding to the j-th transmission duration.

7. The coordinating apparatus of claim 6, wherein in the second transmission mode, the i-th extracting unit extracts and arranges Yik bits of image data into Yik bits of arranged data corresponding to the k-th transmission duration, i=1~P, k=1~L2, Y1+Y2+ . . . YP=N/L2, Yik is a positive integer, and the P-th combining unit outputs N/L2 bits of combined data corresponding to the k-th transmission duration.

8. An image processing system for providing image data to a display device conforming to a transmission standard, the transmission standard comprising at least a first transmission mode and s second transmission mode different from the first transmission mode, the image processing system comprising:

a data providing device for providing M bits of image data;

a programmable coordinating module, electrically coupled to the data providing device and programmed according to the transmission standard, for extracting N bits of image data among the M bits of image data and arranging the N bits of image data into N bits of arranged data, wherein M is a positive integer and N is a positive integer smaller than or equal to M, in the first transmission mode, the coordinating module is programmed to output N/L1 bits of arranged data within each of L1 transmission durations; in the second transmission mode, the coordinating module is programmed to output N/L2 bits of arranged data within each of L2 transmission durations, L1, L2, N/L1 and N/L2 are positive integers and L1≠L2; and an outputting module, electrically coupled to the programmable coordinating module, for outputting the N bits of arranged data to the display device.

9. The image processing system of claim 8, wherein the M bits of image data comprises data of P colors, the programmable coordinating module comprises pipelined P stages of processors, the image data of an ith color among the P colors is processed by an ith stage of processor among the P stages of processors, P is an positive integer, and i is an integer index ranging from 1 to P, the ith stage of processor comprises:

a receiving unit for receiving the image data of the ith color;

a programmable extracting unit, electrically coupled to the receiving unit and programmed according to the transmission standard, for extracting an ith set of selected data from the image data of the ith color and arranging the ith set of selected data into an ith set of arranged data; and a programmable combining unit, electrically coupled to the programmable extracting unit, for receiving the ith set of arranged data and selectively combining the ith set of arranged data with an (i-1)th set of combined data provided by the (i-1)th stage of processor to generate an ith set of combined data.

10. The image processing system of claim 9, wherein P is three, and the P colors are red, green, and blue.

11. The image processing system of claim 9, wherein the ith stage of processor further comprises a command register therein storing an ith set of control signals corresponding to the image data of the ith color; the programmable extracting unit and the programmable combining unit in the ith stage of processor are programmed according to the ith set of control signals.

12. The image processing system of claim 11, wherein the ith set of control signals comprises an enabling signal, a length signal, and a start signal; the enabling signal is relative to whether the ith stage of processor should output the image data of the ith color; the length signal is relative to a length of the image data of the ith color should be outputted by the ith stage of processor; the start signal is relative to a start bit of the image data of the ith color should be outputted by the ith stage of processor.

13. The image processing system of claim 9, wherein in the first transmission mode, the i-th extracting unit extracts and arranges Xij bits of image data into Xij bits of arranged data corresponding to a j-th transmission duration, i=1~P, j=1~L1, X1j+X2j+ . . . XPj=N/L1, Xij is a positive integer, and the P-th combining unit outputs N/L1 bits of combined data corresponding to the j-th transmission duration.

14. The image processing system of claim 13, wherein in the second transmission mode, the i-th extracting unit extracts and arranges Yik bits of image data into Yik bits of arranged data corresponding to the k-th transmission duration, i=1~P, k=1~L2, Y1+Y2+ . . . YP=N/L2, Yik is a positive integer, and the P-th combining unit outputs N/L2 bits of combined data corresponding to the k-th transmission duration.

* * * * *